N. K. CLEMM.
KITCHEN UTENSIL.
APPLICATION FILED MAY 7, 1912.
1,053,573.
Patented Feb. 18, 1913.
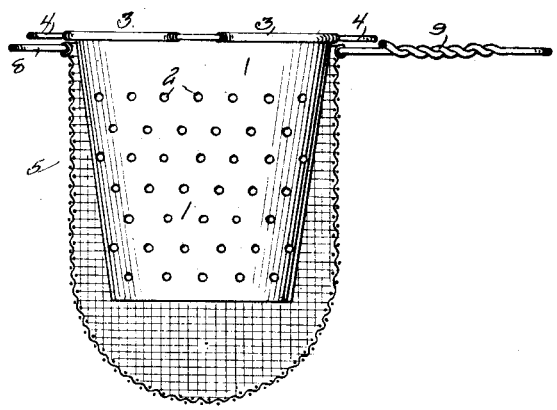
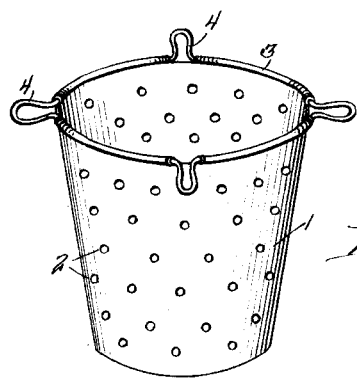
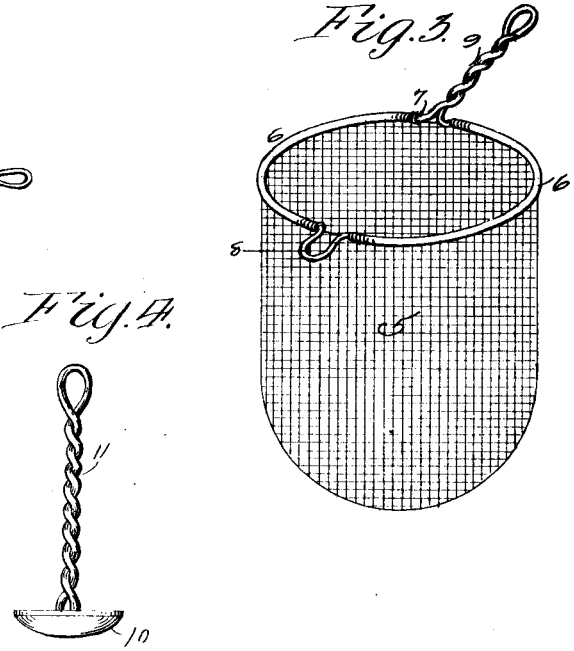
WITNESSES
INVENTOR
Nora K. Clemm,
Richard Oliver
Her Attorney

UNITED STATES PATENT OFFICE.

NORA K. CLEMM, OF BRIDGEPORT, CONNECTICUT.

KITCHEN UTENSIL.

1,053,573.  Specification of Letters Patent.  Patented Feb. 18, 1913.

Application filed May 7, 1912. Serial No. 695,597.

*To all whom it may concern:*

Be it known that I, NORA K. CLEMM, a citizen of the United States, residing at Bridgeport, in the county of Fairfield and State of Connecticut, have invented new and useful Improvements in Kitchen Utensils, of which the following is a specification.

This invention relates to kitchen utensils and more specifically to that class of kitchen utensils which combines several devices into a compact article which can be easily handled, which is durable and efficient in operation and one which can be manufactured at a very small cost.

The utensil herewith disclosed, combines an ordinary colander and sieve into a compact structure which as has been above pointed out, can be easily handled and manufactured and placed upon the market at a minimum cost.

With the above and other objects in view, my invention relates to such details of construction and in the arrangement and combination of the several parts as will be hereinafter fully described and specifically pointed out in the appended claims.

In describing my invention in detail reference will be had to the accompanying drawings wherein like characters denote like or corresponding parts throughout the several views and in which, Figure 1 is a side elevation of my invention. Fig. 2 is a perspective view of the colander. Fig. 3 is a perspective view of the sieve. Fig. 4 is a side elevation of the masher used.

In the accompanying drawings wherein is illustrated the preferred form of my invention, the numeral 1 designates the body portion of the colander which is formed from a continuous piece of material, said piece of material being provided with a plurality of perforations 2 and having its upper edge rolled as shown at 3. Sections of the rolled portions are cut away as shown for the purpose hereinafter set forth. A strand of wire bent in a substantially circular form is provided, which has portions thereof bent outwardly as shown at 4 so that when the same is disposed in the position shown beneath the rolled portions 3, the said bent out portions will project through the cut away sections thereby forming supporting arms.

The sieve comprises a body portion 5 constructed of wire which has connection with the semicircular sleeves 6, through which sleeves extend a wire strand 7. A portion of the wire strand is bent outwardly as at 8 while another portion is twisted as shown at 9 to form a handle.

It is readily obvious that when the colander is disposed within the sieve that the bent portions 4 of the first strand of wire will engage the upper edges of the same and support the colander. The twisted portion 9 of the wire strand which is carried by the sieve, serves as a handle as has above been pointed out and in this provision it is readily obvious that the operation of the utensil is greatly facilitated. It is also obvious that the bent out portion 8 can be used as a handle when occasion requires.

In Fig. 4 I have illustrated a peculiar form of masher which comprises a substantially convex head portion 10 which has connected thereto a twisted strand of wire 11 which strand of wire forms a head portion by which the same may be operated.

I desire it to be understood that I may make slight changes in the construction and in the arrangement and combination of the several parts, provided such changes fall within the scope of the sub-joined claims.

Having thus fully described my invention what I claim as new and desire to secure by Letters Patent is:—

1. In a device of the character described, a colander having supporting arms projecting therefrom, a sieve having a handle attached thereto, said sieve adapted to receive said colander and said supporting arms adapted to engage the upper edges of said sieve for the purpose described.

2. In a device of the character described, a colander having its upper edges rolled to receive a circular strand of wire, portions of said wire forming supporting arms, a sieve having a handle portion formed thereon, said sieve adapted to receive said colander, said supporting arms engaging the upper edge of said sieve for the purpose described.

3. In a device of the character described, a colander having its upper edges rolled, sections of said rolled edges cut away, a strand of wire bent in a circular form, portions of said strand bent outwardly and extending through said cut away sections to form supporting arms, a sieve having a handle portion formed thereon, said sieve adapted to receive said colander, said supporting arms engaging the upper edge of said sieve for the purpose described.

4. In a device of the character described, a colander having its upper edges rolled, sections of said rolled portions cut away, a strand of wire in engagement with said rolled portions, sections of said wire bent outwardly through said cut away sections to form supporting arms, a sieve having connection at its upper end with semicircular sleeves, a strand of wire extending through said sleeves, a portion of said last mentioned strand twisted to form said handle, a section thereof bent to form a supporting arm, said sieve adapted to receive said colander, said first mentioned supporting arms engaging said sleeves for the purpose described.

NORA K. CLEMM.

Witnesses:
SARAH L. STEPPE,
NELLIE SULLIVAN.